United States Patent [19]

Laub

[11] 4,227,710
[45] Oct. 14, 1980

[54] MOBILE BASEBALL EQUIPMENT STORAGE DEVICE

[75] Inventor: Bernard C. Laub, Tulsa, Okla.

[73] Assignee: Hugh J. Finnerty, Tulsa, Okla. ; a part interest

[21] Appl. No.: 13,988

[22] Filed: Feb. 22, 1979

[51] Int. Cl.$^3$ .............................................. B62B 1/26
[52] U.S. Cl. .................................. 280/47.19; 211/13; 211/60 R; 280/47.33; 280/DIG. 6
[58] Field of Search .......... 280/47.19, 47.33, DIG. 6, 280/47.26, 47.24, 47.17; 211/60 R, 60 G, 60 T, 68, 13

[56] References Cited

U.S. PATENT DOCUMENTS

| | | | |
|---|---|---|---|
| 1,244,030 | 10/1917 | Cave | 280/47.26 X |
| 1,264,048 | 4/1918 | Forster | 280/47.33 |
| 2,520,226 | 8/1950 | Smith | 280/47.19 X |
| 2,551,009 | 5/1951 | Kaltenbach | 280/47.19 |
| 2,883,207 | 4/1959 | Reich | 280/47.19 |
| 3,147,988 | 9/1964 | Schairer | 280/DIG. 6 |
| 3,869,137 | 3/1975 | Byrom | 280/47.19 |
| 3,876,223 | 4/1975 | O'Reilly et al. | 280/47.19 |
| 4,126,327 | 11/1978 | Taber | 280/47.26 |

Primary Examiner—John J. Love
Assistant Examiner—Milton L. Smith
Attorney, Agent, or Firm—William S. Dorman

[57] ABSTRACT

A wheeled cart for carrying and storing baseball equipment has upper and lower shelves attached to a back panel with the shelves extending between side members extending at right angles to the back panel. The upper shelf is secured to the back panel at a location spaced from the top of the panel and has a plurality of spaced slots to receive the handle ends of baseball bats. The other ends of the bats are received in indentations in the lower shelf and the bats are retained on the cart by a detachable strap. A vertical member extends between the shelves adjacent one side member and vertical strips are attached to the vertical member and the side member to form a compartment for storing baseballs. The back of the back panel is provided with detachable straps for retaining bases and other equipment and the front of the back panel has a bracket cooperating with a slot in the upper shelf to hold a home plate. A foldable stand extends away from the back panel to support the cart in an upright position for use as a bat rack and is folded to a storage position during movement of the cart.

5 Claims, 6 Drawing Figures

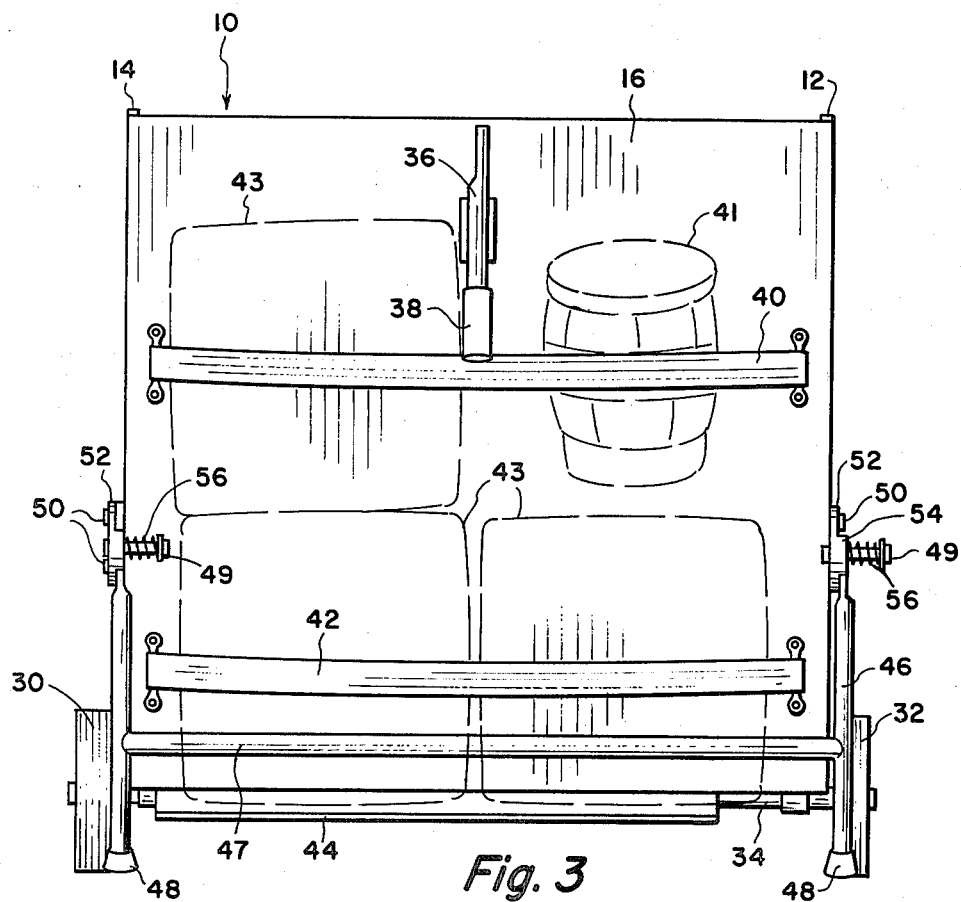
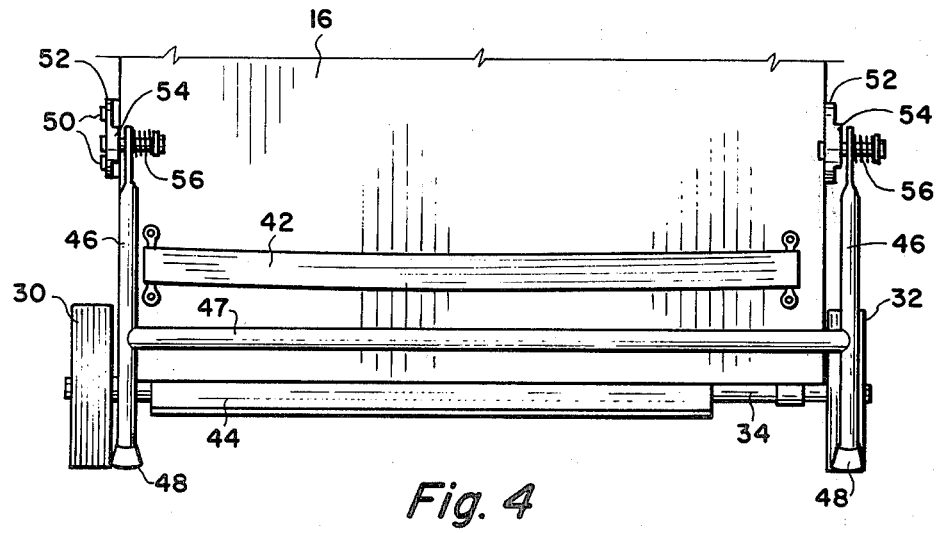

MOBILE BASEBALL EQUIPMENT STORAGE DEVICE

BACKGROUND OF THE INVENTION

1. Field of the Invention

The present invention relates to a mobile baseball equipment storage device and, more particularly, to such a device which is open-faced in nature and which is adapted, when positioned adjacent the baseball playing field, to serve as a bat rack and storage device for balls to be used during the playing of the game.

2. Description of the Prior Art

There are a great number of amateur baseball leagues, such as church leagues and municipal park leagues, school leagues and other leagues comprised of boys and girls in grammar school, which are commonly known as "Little League." these "Little League" baseball games are usually informal in nature and, sometimes, because of the youth of the players, the baseball equipment is often improperly cared for. The baseball equipment, such as bats, balls, bases, and other equipment, are often loosely stored and transported to and from the game in a box or large cloth bag. The box is often heavy and requires two people to carry, while the bag is easily torn and ungainly to carry. The baseball bats can be dented or broken, baseballs can be scuffed or easily lost, and the bases and other equipment can be damaged while being transported within the box or bag. While the game is in progress, the unused bats and balls are left on the ground where they can be tripped over, stepped on and possibly cause an injury. These bats and balls can also become lost or misplaced.

In the past, numerous portable or mobile baseball equipment storage devices have been proposed. However, none of these prior art devices have been of an open-faced design which would permit the device to serve as a bat rack at the site of a game.

SUMMARY OF THE INVENTION

The present invention generally provides a mobile baseball equipment storage device that can be easily transported by one person. All the equipment needed for a team, except the individual player's mits, is stored on or in this device. The baseball equipment storage device is designed to neatly arrange and separately store the various baseball equipment thereby decreasing the probability of damage to or loss of the equipment. At the site of the game, this device serves as a bat rack and a storage device for balls to be used during the game.

The present invention, more particularly, comprises a substantially rectangular enclosure of an open-faced design. The mobile baseball equipment storage device of the present invention is defined by a substantially rectangular upright back member or panel, a pair of parallel vertical side members connected along the side edges of the back panel and extending outwardly on one side of the back panel substantially at right angles thereto; a bottom shelf extends horizontally along the lower edge of the back panel between the side members. A top shelf extends horizontally between the side members at a location spaced from the upper edge of the back member. An intermediate vertical member spaced between the two side members and adjacent one of the side members extends vertically between the bottom shelf and the top shelf so as to form a vertical storage compartment with the adjacent side member for the storage of baseballs in this compartment. Vertical strips located on the intermediate side member and on the adjacent side member and extending from a position spaced below the upper shelf to a position spaced above the lower shelf serve to retain the baseballs in the vertical compartment. The upper shelf is provided with a plurality of spaced slots, each of which is adapted to receive the upper handle portion of a baseball bat. The lower shelf is provided with a plurality of spaced circular indentations located below the slots, each indentation being adapted to receive the lower end of a baseball bat. A detachable strap extends from the intermediate vertical member to the side member opposite from the adjacent side member for holding bats in the storage device during transit. A pair of spaced wheels are mounted on the device to permit the rolling thereof. A handle is mounted on the device to assist in the transit thereof. A foldable stand is mounted on the device and is adapted, in one position thereof, to maintain the storage device in substantially the upright position and, in a second position of the stand, is folded out of the way to permit the rolling movement of the equipment storage device. When the device is positioned adjacent the site of a baseball game, the front strap is removed such that the device serves as a bat rack. The spaced slots in the top shelf extend partway only in from the outer edge of the shelf whereby sufficient space remains for the storage of equipment, such as shin guards, between the back panel and the upper handle portions of the baseball bats. An elongated cut-out is provided on the back side of the top shelf and a brace means is located on the front face of the back panel below this cutout so as to support home plate against the front face of the back panel. A plurality of spaced detachable strap means are provided on the back side of the back panel and a lower shelf extends outwardly from the back side of the back panel so as to cooperate with these spaced detachable strap means for holding bases and other auxiliary equipment against the back side of the back panel.

BRIEF DESCRIPTION OF THE DRAWINGS

FIG. 3 is a rear elevational view thereof, with certain other stored equipment shown in dotted lines;

FIG. 4 is a view showing the lower portion of FIG. 3 with the supporting stand being moved to a position which will permit upward folding or rotation thereof;

DETAILED DESCRIPTION OF THE PREFERRED EMBODIMENTS

Figure 1:
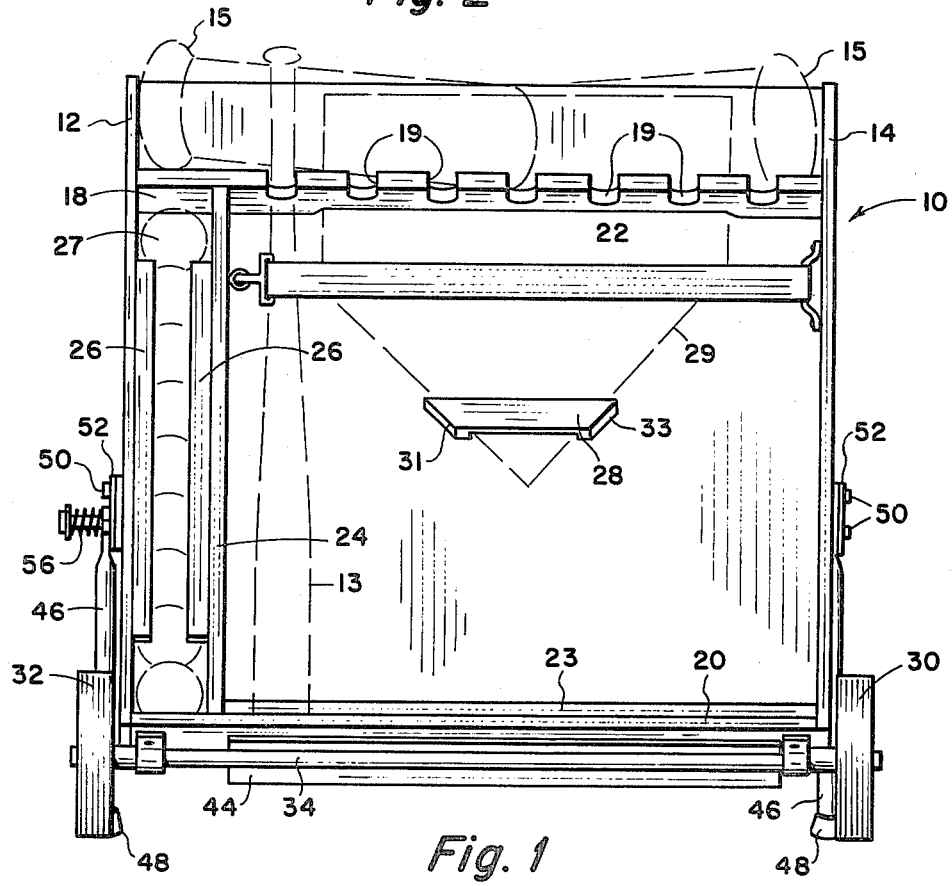
FIG. 1 is a front elevational view of a mobile baseball equipment storage device embodying the present invention, with certain stored equipment shown in dotted lines.

Referring to the drawings in detail, reference character 10 generally indicates a mobile baseball equipment storage device or a "baseball caddy" particularly designed for storage and transportation of baseball equipment and which may be constructed from wood or some other suitable material. As shown in FIG. 1, the baseball caddy 10 is substantially rectangular in shape and is disposed, in FIGS. 1 to 5, in a substantially vertical or upright position. The caddy 10 is formed by a pair of spaced and narrow side panels 12 and 14 which are connected to the opposite side edges of a wide back panel 16. A horizontal bottom shelf 20 extends along the lower edge of the back panel 16 and connects with the lower ends of the side panels 12 and 14. These members, and most of the members later to be described, are suitably connected together by nails, screws or glue as would be well-known in the art.

An upper horizontal shelf 18 spaced somewhat below the upper edge of the back panel 16 extends across the caddy 10 substantially parallel to the lower shelf 20 and connects at its ends to the narrow side panels 12 and 14. An intermediate narrow vertical panel 24 of substantially the same width as the panels 12 and 14, extends parallel to the panels 12 and 14 and is located slightly to the right of the panel 12 for a purpose which will hereinafter appear. The upper and lower ends of the intermediate panel 24 are connected to the upper and lower shelves 18 and 20, respectively. A horizontal member or board 23 of substantially the same width as the lower shelf 20 rests on the shelf 20 and extends therealong between the intermediate panel 24 and the narrow vertical panel 14.

The upper horizontal shelf 18 is provided with a plurality of spaced slots 19, which are adapted to receive the upper ends or the handles of baseball bats 13 (shown by dotted lines); the horizontal member 23 is provided with a plurality of circular indentations or cut-outs 21 which are equal to the number of slots 19 and which are disposed directly beneath the slots 19. These circular indentations 21 are adapted to receive the lower ends of the bats 13. A detachable horizontal strap 22 is adapted to hold the bats 13 in position while the baseball caddy 10 is being moved from place to place. However, when the baseball caddy 10 is positioned adjacent the playing field, as typified by the position shown in FIG. 5, the horizontal strap is detached so that the bats may be easily removed. As thus described, the baseball caddy provides an open-faced design which distinguishes over the prior art such that the caddy serves as a bat rack when it is positioned adjacent the playing field.

Figure 2:
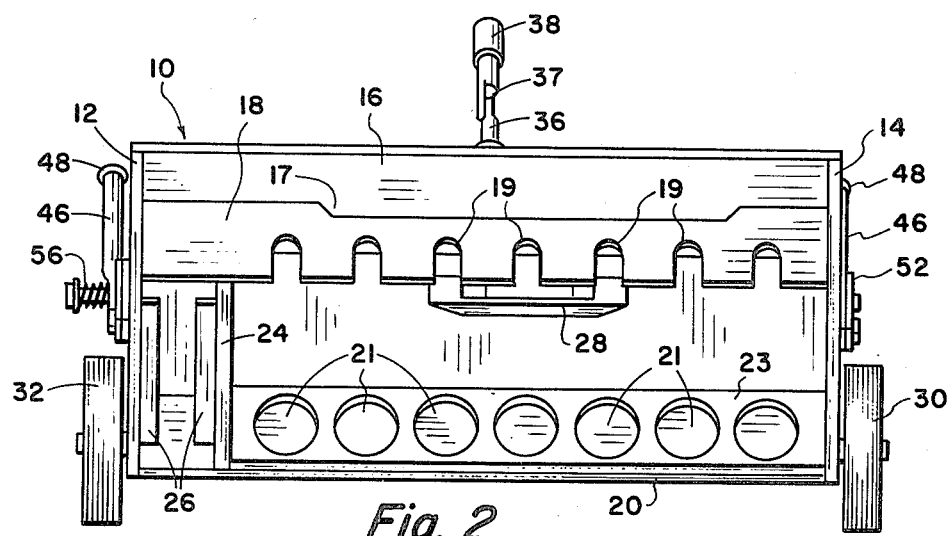
FIG. 2 is a plan view of the device.

As best shown in FIG. 2, the horizontal shelf 18 is provided with an elongated narrow cut-out 17 so as to form a space between the rear of the shelf 18 and the back panel 16 for the purpose of receiving the upper or wide end of homeplate 29 (shown by dotted lines). A short horizontal member 28 connects with the back panel 16 by a pair of short legs 31 and 33. The member 28 and the legs 31 and 33 form a brace located below the center of the space 17 to hold the lower triangular end of homeplate 29, the upper wide end of which is received in the space 17 between the horizontal member 28 and the back panel 16.

As shown in FIG. 2, the slots 19 extend only partway from the front edge of the upper shelf 18 such that the baseball player's shin guards 15 (shown by dotted lines) and/or other baseball equipment (not shown) may be stored on top of shelf 18 between the back panel 16 and the handles of the baseball bats 13. A catcher's chest protector (not shown) and a pitching rubber (not shown) may be stored in the space between the bats 13 and the back panel 16.

As shown in FIG. 1, the space between the intermediate narrow panel 24 and the narrow side panel 12 forms a vertical compartment in which a plurality of baseballs 27 (shown by dotted lines) may be stored. Two vertical bars or strips 26 are connected along the front edges of the vertical panels 12 and 24 so as to partially cover the front opening of the vertical compartment formed by the panel 24 and panel 12. These bars 26 are adapted to retain the baseballs in the vertical space just described. However, the upper ends of the bars 26 are spaced below the horizontal shelf 18 so that a baseball 27 can be removed from the top of this vertical compartment; similarly, the bottoms of the bars 26 are spaced above the lower horizontal shelf 20 so that a baseball 27 may also be removed from the bottom of this vertical compartment.

Figure 6:
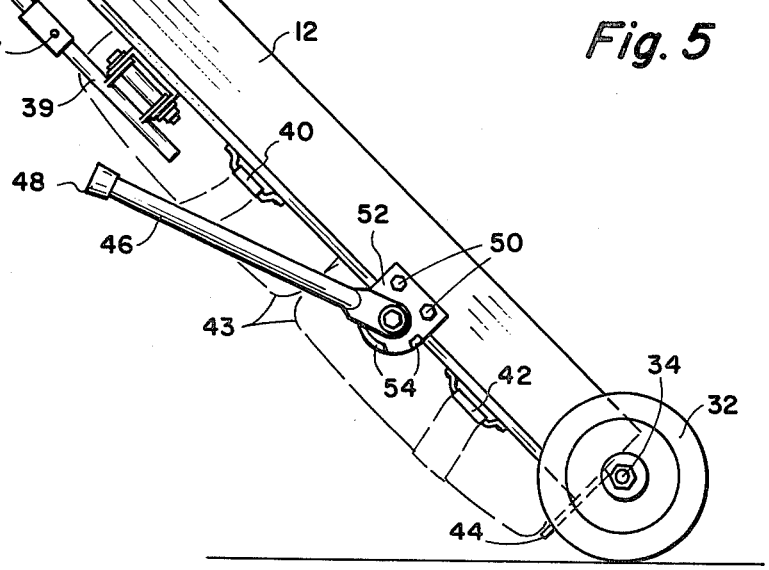
FIG. 6 is a left side elevational view similar to FIG. 5, but showing certain stored equipment in dotted lines and showing the stand folded out of the way for transportation of the device over the ground.

As shown in FIGS. 3 and 6, a catcher's mask 41 (shown by dotted lines) and three bases 43 (shown by dotted lines) may be stored against the back of the panel 16 by means of two detachable horizontal straps 40 and 42. A rearwardly extending horizontal shelf 44 also assists in the storage of the bases 43.

Figure 5:
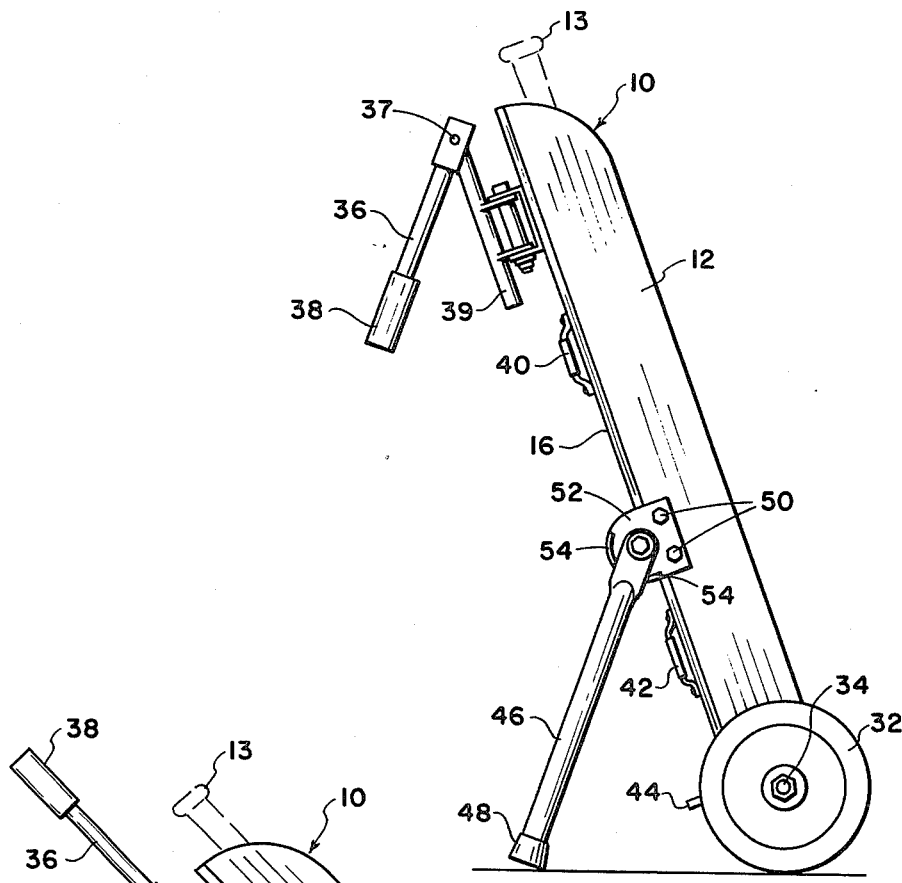
FIG. 5 is a left side elevational view of the device.

In order to permit the caddy 10 to be rolled over the ground, a pair of wheels 30 and 32 are mounted at the opposite ends of an axle 34 which is secured in any suitable manner to the underside of the panel 20. As best shown in FIGS. 5 and 6, a folding handle 36 with a grip 38 thereon is pivotally connected to an inner handle portion 39 by means of the pivotal connection 37. Thus, the handle may be folded out of the way as shown in FIG. 5 or it may be extended as in FIG. 6 so that the baseball caddy can be pulled over the ground.

The baseball caddy may be maintained in a substantially upright position as shown in FIGS. 1 through 5 for ease of access to equipment and for use as a bat rack while the game is in progress by means of a folding stand which is formed by a pair of legs 46 which are interconnected by means of a horizontal cross brace 47. The lower ends of the legs 46 may be provided with plastic tips 48, as desired. The upper ends of the legs 46 are pivotally connected to stub shafts 49 which extend at right angles and in the same direction (as best shown in FIGS. 3 and 4) from a pair of brackets 52 which are connected to the side panels 12 and 14 by means of bolts 50. The brackets 52 are provided with studs 54 which extend behind the legs 46 in the position shown in FIGS. 3 and 5 to retain the legs in their lower or supporting position. Springs 56 received on the stub shafts 49 are adapted to push the legs 46 against the brackets 52 to retain the legs in the position shown in FIGS. 3 and 5. However, if it is desired to move the legs in the position shown in FIG. 6, the stand is urged to the right as shown in FIG. 4 so that the stand may now be folded past the studs 54 upwardly to the position shown in FIG. 6.

Whereas the present invention has been described in particular relation to the drawings attached hereto, it should be understood that other and further modifications of the invention, apart from those shown or suggested herein, may be made within the scope and spirit of this invention.

What is claimed is:

1. A mobile baseball equipment storage device comprising a substantially rectangular upright back panel having an upper edge, a lower edge and a pair of spaced parallel side edges; a pair of parallel vertical side members connected along the side edges of said back panel and extending outwardly on one side of said back panel substantially at right angles thereto; a bottom shelf extending horizontally along the lower edge of said back panel between said side members; a top shelf extending horizontally between said side members at a location spaced from the upper edge of said back member; an intermediate vertical member spaced between said two side members and adjacent one of said side members extending vertically between said bottom shelf and said top shelf and forming with said adjacent side member a vertical compartment for the storage of baseballs therein; vertical strips located on said intermediate side member and said adjacent side member and extending from a position spaced below said upper shelf to a position spaced above said lower shelf to retain the baseballs in said vertical compartment; said upper shelf having a plurality of spaced slots, each of which is adapted to receive the upper handle portion of a baseball bat; said lower shelf member having a plurality of spaced indentations located below said slots, each indentation being adapted to receive the lower end of a baseball bat; a detachable strap means extending from said intermediate vertical member to the side member opposite from said adjacent side member for holding said bats in said storage device; a pair of spaced wheels mounted on said device to permit the rolling thereof; a handle on said device, and a foldable stand mounted on said device and adapted in one position of said stand to maintain said storage device in a substantially upright position and in a second position of said stand being folded out of the way to permit the rolling movement of said device.

2. A mobile baseball equipment storage device as set forth in claim 1 wherein said top shelf is provided with an elongated cut-out on the backside thereof, and wherein said back panel is provided with a brace means extending from the frontside thereof located below said cut-out.

3. A mobile baseball equipment storage device as set forth in claim 1 wherein said spaced slots extend from the outer edge of said top shelf partway in only whereby sufficient space remains for storage of equipment between said back panel and upper handle portions of said baseball bats when received within said spaced slots.

4. A mobile baseball equipment storage device as set forth in claim 1 wherein said back panel is provided with a plurality of spaced detachable strap means attached to the backside thereof.

5. A mobile baseball equipment storage device as set forth in claim 4 wherein said back panel is provided with a lower shelf extending from the backside thereof and cooperating with said plurality of spaced detachable strap means for holding bases and auxiliary equipment against the backside of said back panel.

* * * * *